(12) United States Patent
Sjöberg et al.

(10) Patent No.: US 12,143,619 B2
(45) Date of Patent: Nov. 12, 2024

(54) PICTURE HEADER PRESENCE

(71) Applicant: Telefonaktiebolaget LM Ericsson (publ), Stockholm (SE)

(72) Inventors: Rickard Sjöberg, Stockholm (SE); Martin Pettersson, Vallentuna (SE); Mitra Damghanian, Upplands-Bro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/238,728

(22) Filed: Aug. 28, 2023

(65) Prior Publication Data

US 2024/0064322 A1    Feb. 22, 2024

Related U.S. Application Data

(63) Continuation of application No. 17/972,359, filed on Oct. 24, 2022, now Pat. No. 11,778,221, which is a
(Continued)

(51) Int. Cl.
*H04N 19/46* (2014.01)
*H04N 19/169* (2014.01)
(Continued)

(52) U.S. Cl.
CPC .......... *H04N 19/46* (2014.11); *H04N 19/174* (2014.11); *H04N 19/188* (2014.11); *H04N 19/70* (2014.11)

(58) Field of Classification Search
CPC .................................................. H04N 19/70
See application file for complete search history.

(56) References Cited

U.S. PATENT DOCUMENTS

2005/0286640 A1    12/2005 Gaylord
2007/0133674 A1    6/2007 Garnier et al.
(Continued)

FOREIGN PATENT DOCUMENTS

CN    104737541 A    6/2015
CN    107465932 A    12/2017
(Continued)

OTHER PUBLICATIONS

International Search Report and Written Opinion issued in International Application No. PCT/EP2020/076815 dated Nov. 13, 2020 (13 pages).
(Continued)

*Primary Examiner* — Fabio S Lima
(74) *Attorney, Agent, or Firm* — Rothwell, Figg, Ernst & Manbeck, P.C.

(57) ABSTRACT

A method for decoding a picture from a bitstream. In one embodiment, The method includes: receiving a slice header for a slice of the picture, wherein the slice header comprises a state syntax element; decoding a state value from the state syntax element in the slice header, wherein a) if the state value is not equal to a first value, then the state value indicates that i) the bitstream includes for the picture a picture header comprising a set of picture syntax elements and ii) the slice header does not comprise the set of picture syntax elements and b) if the state value is equal to the first value, then the state value indicates that i) the slice header contains said set of picture syntax elements and ii) the bitstream does not include a picture header for the picture; and using the set of picture syntax elements to decode the slice of the picture.

20 Claims, 10 Drawing Sheets

Related U.S. Application Data continuation of application No. 17/531,112, filed on Nov. 19, 2021, now Pat. No. 11,490,106, which is a continuation of application No. 17/122,835, filed on Dec. 15, 2020, now Pat. No. 11,190,792, which is a continuation of application No. PCT/EP2020/076815, filed on Sep. 24, 2020.

(60) Provisional application No. 62/959,123, filed on Jan. 9, 2020.

(51) Int. Cl.
 *H04N 19/174* (2014.01)
 *H04N 19/70* (2014.01)

(56) References Cited

U.S. PATENT DOCUMENTS

| | | | |
|---|---|---|---|
| 2012/0230441 A1 | 9/2012 | Kato | |
| 2013/0177076 A1* | 7/2013 | Itani | H04N 19/52 375/240.03 |
| 2013/0194384 A1* | 8/2013 | Hannuksela | H04N 19/124 348/43 |
| 2013/0343465 A1* | 12/2013 | Chen | H04N 19/70 375/240.24 |
| 2015/0103251 A1* | 4/2015 | Gaylord | H04N 19/44 348/598 |
| 2015/0195577 A1* | 7/2015 | Hannuksela | H04N 19/70 375/240.25 |
| 2018/0302636 A1 | 10/2018 | Yu | |
| 2019/0253736 A1* | 8/2019 | Schierl | H04N 21/4728 |
| 2021/0185359 A1 | 6/2021 | Choi | |
| 2021/0203942 A1 | 7/2021 | Choi | |
| 2021/0203967 A1 | 7/2021 | Choi | |
| 2021/0211735 A1 | 7/2021 | Stockhammer | |
| 2021/0218978 A1 | 7/2021 | Sjöberg | |
| 2021/0235078 A1 | 7/2021 | Hu | |
| 2021/0314582 A1 | 10/2021 | Choi | |
| 2021/0392381 A1 | 12/2021 | Wang | |
| 2022/0232229 A1 | 7/2022 | Hendry | |

FOREIGN PATENT DOCUMENTS

| | | | |
|---|---|---|---|
| JP | 2023-509684 | 3/2023 | |
| WO | 2013/187698 A1 | 12/2013 | |
| WO | 2021137588 | 7/2021 | |
| WO | WO-2021137588 A1 * | 7/2021 | ........... H04N 19/174 |

OTHER PUBLICATIONS

Li, et al., "AHG9: On Picture Header," JVET-Q0419-v2, Jan. 3, 2020 (5 pages).
Sjoberg, et al., "AHG9: Picture Header Enabled Flag," JVET-Q0426-v1, Dec. 31, 2019 (15 pages).
Hannuksela, et. al., "Header parameter set (HPS)", JVET-L0183, Oct. 5, 2018 (9 pages).
Samuelsson, et. al., "AHG9: Coded Picture NAL unit," JVET-Q0255, Jan. 2020 (8 pages).
Bross, B., et. al., "Versatile Video Coding (Draft 7)", JVET-QJVET-P2001-vE, ITU-T, Dec. 5, 2019, jvet-experts.org/doc_end_user/documents/17_Brussels/wg11/JVET-Q0041-v1.zip, pp. 90-91 (3 pages).
Wang, L., "Implementation and Optimization of AVS Interframe Decoding Algorithm", S20090368, May 2012 (68 pages).
Laumer, M. et al., "Compressed Domain Moving Object Detection by Spatio-Temporal Analysis of H.264/AVC Syntax Elements", IEEE 2015 (5 pages).

* cited by examiner

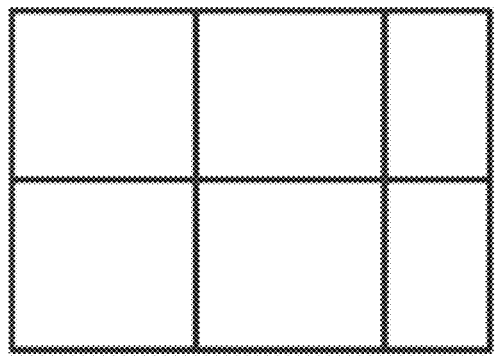
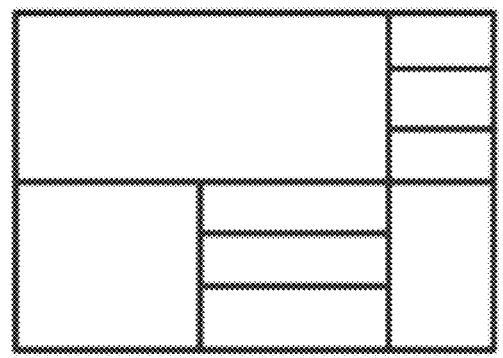
Tiles                Slices
Figure 4
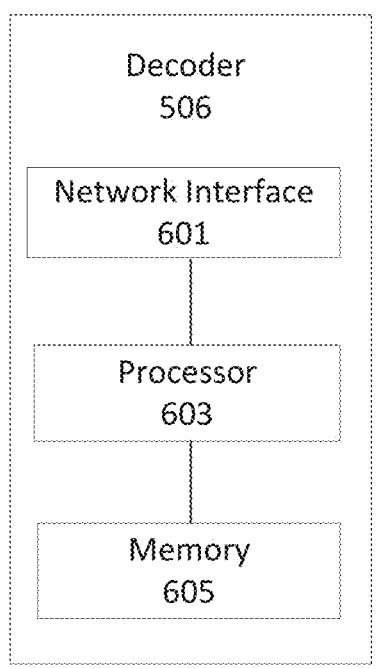
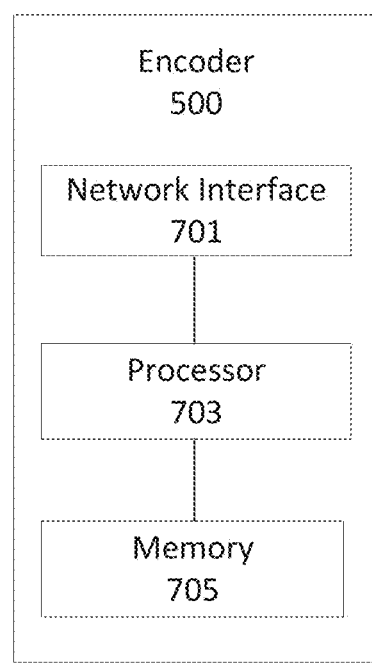
Figure 6                Figure 7

```
┌─────────────────────────────────────────────────────────────────┐
│ Decode a first state value from a first state syntax element in │
│ a parameter set, the first state value specifying whether or    │
│ not a second state value from a second state syntax element in  │
│ all slice headers in a CVS or CLVS shall be the same for all    │
│ picture headers                                                 │
│                              801                                │
└─────────────────────────────────────────────────────────────────┘
```

```
                    ┌─────────────┐        Not The        ╱╲  ╱── 803
                    │ Decode each │         Same         ╱  ╲╱
                    │ slice on its│◄─────────────  Same for
                    │    own      │               all picture
                    └─────────────┘                headers?
                                                       ╲  ╱
                                                        ╲╱
                                                        │ Same
                                                        ▼
```

```
┌─────────────────────────────────────────────────────────────────┐
│ Decode a second state value from a second state syntax element  │
│ in a slice header of a first picture, the second state value    │
│ specifying whether or not picture headers are used for the      │
│ first picture                                                   │
│                              805                                │
└─────────────────────────────────────────────────────────────────┘
```

```
          Second value          ╱╲
               ┌───────── First value or
               ▼              second value?            Figure 8A
              (A)                  ╲╱
                                    │ First value
                                    ▼
```

```
┌─────────────────────────────────────────────────────────────────┐
│   Deduce that that there is no picture header for the current   │
│                             picture                             │
│                              807                                │
└─────────────────────────────────────────────────────────────────┘
```

```
┌─────────────────────────────────────────────────────────────────┐
│ Decode a first set of syntax elements for the slice header to   │
│           obtain decoded values of the first set of syntax      │
│                            elements                             │
│                              809                                │
└─────────────────────────────────────────────────────────────────┘
```

```
┌─────────────────────────────────────────────────────────────────┐
│ Use the decoded values of the first set of syntax elements to   │
│              decode the slice of the first picture              │
│                              811                                │
└─────────────────────────────────────────────────────────────────┘
```

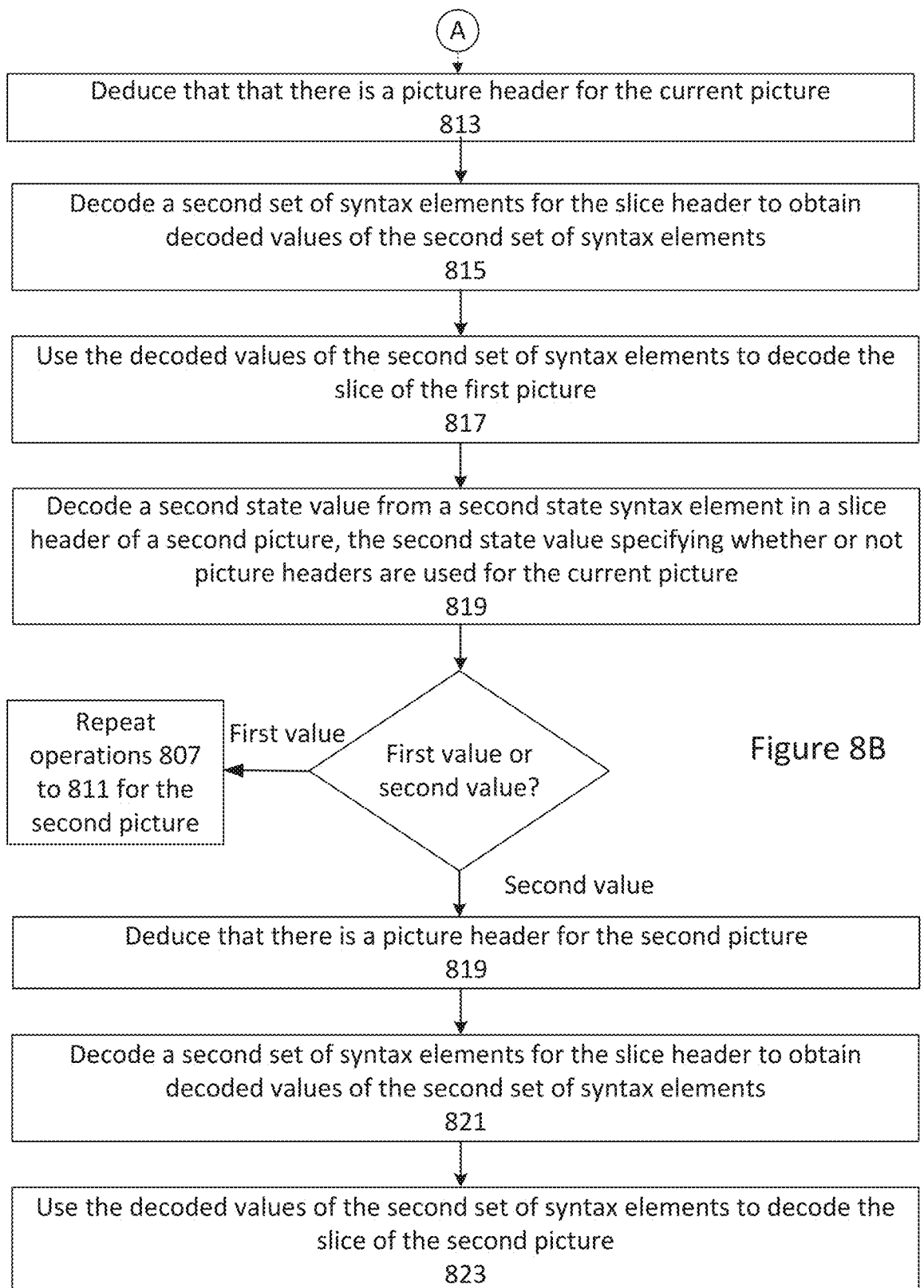

```
┌─────────────────────────────────────────────────────────────────────┐
│ Decode a first state value from a first state syntax element in a  │
│ slice header of a slice of a first picture, the first state value  │
│ specifying whether or not picture headers are used for the first   │
│ picture                                                             │
│ 901                                                                 │
└─────────────────────────────────────────────────────────────────────┘
                                  ↓
┌─────────────────────────────────────────────────────────────────────┐
│ Decode a second state value from a first state syntax element in a │
│ slice header of a second picture, the second state value specifying│
│ whether or not picture headers are used for the second picture     │
│ 903                                                                 │
└─────────────────────────────────────────────────────────────────────┘
```

```
                    ┌──────────┐          ╱╲
                    │   Not    │   No    ╱  ╲  Second state value
                    │ Compliant│◄───────╱    ╲ expressing same meaning
                    │   905    │        ╲    ╱ as first state value?
                    └──────────┘         ╲  ╱
                                          ╲╱
                                           │ Yes
                                           ↓
                                                         Figure 9A
                                          ╱╲
                      Second value       ╱  ╲  First value or
                    ┌───────────────────╱    ╲ second value?
                    │                   ╲    ╱
                    ↓                    ╲  ╱
                   (A)                    ╲╱
                                           │ First value
                                           ↓
```

```
┌─────────────────────────────────────────────────────────────────────┐
│ Deduce that that there is no picture header for the current picture│
│ 907                                                                 │
└─────────────────────────────────────────────────────────────────────┘
                                  ↓
┌─────────────────────────────────────────────────────────────────────┐
│ Decode a first set of syntax elements for the slice header to      │
│ obtain decoded values of the first set of syntax elements          │
│ 909                                                                 │
└─────────────────────────────────────────────────────────────────────┘
                                  ↓
┌─────────────────────────────────────────────────────────────────────┐
│ Use the decoded values of the first set of syntax elements to      │
│ decode the slice of the first picture                              │
│ 911                                                                 │
└─────────────────────────────────────────────────────────────────────┘
```

PICTURE HEADER PRESENCE

CROSS-REFERENCE TO RELATED APPLICATIONS

This application is a continuation of U.S. application Ser. No. 17/972,359, filed on Oct. 24, 2022 (now U.S. Pat. No. 11,778,221, issued on Oct. 3, 2023), which is a continuation of U.S. application Ser. No. 17/531,112, filed on Nov. 19, 2021 (now U.S. patent Ser. No. 11/490,106, issued on Nov. 1, 2022), which is a continuation of U.S. application Ser. No. 17/122,835, filed on Dec. 15, 2020 (now U.S. Pat. No. 11,190,792, issued on Nov. 30, 2021), which is a bypass continuation of International Patent Application No. PCT/EP2020/076815, filed on Sep. 24, 2020, which claims priority to U.S. provisional patent application No. 62/959,123, filed on Jan. 9, 2020. The above identified applications and patents are incorporated by this reference.

TECHNICAL FIELD

The present disclosure relates generally to methods and apparatuses for video encoding and decoding.

BACKGROUND

High Efficiency Video Coding (HEVC) is a block-based video codec standardized by ITU-T (International Telecommunication Union Telecommunication Standardization Sector) and MPEG (Moving Pictures Expert Group) that utilizes both temporal and spatial prediction. Spatial prediction is achieved using intra (I) prediction from within the current picture. Temporal prediction is achieved using uni-directional (P) or bi-directional inter (B) prediction on block level from previously decoded reference pictures. In the encoder, the difference between the original pixel data and the predicted pixel data, referred to as the residual, is transformed into the frequency domain, quantized and then entropy coded before transmitted together with necessary prediction parameters such as prediction mode and motion vectors, also entropy coded. The decoder performs entropy decoding, inverse quantization and inverse transformation to obtain the residual, and then adds the residual to an intra or inter prediction to reconstruct a picture.

MPEG and ITU-T are working on the successor to HEVC within the Joint Video Exploratory Team (JVET). The name of this video codec under development is Versatile Video Coding (VVC). The current version of the VVC specification at the time of filing this application is JVET-Q0041-v2_DraftText.docx.

NAL Units

Both HEVC and VVC define a Network Abstraction Layer (NAL). All the data, i.e. both Video Coding Layer (VCL) or non-VCL data in HEVC and VVC is encapsulated in NAL units. A VCL NAL unit contains data that represents picture sample values. A non-VCL NAL unit contains additional associated data such as parameter sets and supplemental enhancement information (SEI) messages. The NAL unit in HEVC begins with a header which specifies the NAL unit type of the NAL unit that identifies what type of data is carried in the NAL unit, the layer ID and the temporal ID for which the NAL unit belongs to. The NAL unit type is transmitted in the nal_unit_type codeword in the NAL unit header and the type indicates and defines how the NAL unit should be parsed and decoded. The rest of the bytes of the NAL unit is payload of the type indicated by the NAL unit type. A bitstream consists of a series of concatenated NAL units. A bitstream consists of a series of concatenated NAL units.

The syntax for the HEVC NAL unit and NAL unit header is shown in Table 1.

TABLE 1

| HEVC NAL unit syntax | |
| --- | --- |
|  | Descriptor |
| nal_unit_header( ) { | |
| forbidden_zero_bit | f(1) |
| nuh_reserved_zero_bit | u(1) |
| nuh_layer_id | u(6) |
| nal_unit_type | u(5) |
| nuh_temporal_id_plus1 | u(3) |
| } | |

The NAL unit types of the current VVC draft are shown in Table 2.

The decoding order is the order in which NAL units shall be decoded, which is the same as the order of the NAL units within the bitstream. The decoding order may be different from the output order, which is the order in which decoded pictures are to be output, such as for display, by the decoder.

TABLE 2

| NAL unit types in VVC | | | |
| --- | --- | --- | --- |
| nal_unit_type | Name of nal_unit_type | Content of NAL unit and RBSP syntax structure | NAL unit type class |
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4 . . . 6 | RSV_VCL_4 . . . RSV_VCL_6 | Reserved non-IRAP VCL NAL unit types | VCL |
| 7 | IDR_W_RAD | Coded slice of an IDR picture slice_layer_rbsp( ) | VCL |
| 8 | IDR_N_LP | | |
| 9 | CRA_NUT | Coded slice of a CRA picture silce_layer_rbsp( ) | VCL |
| 10 | GDR_NUT | Coded slice of a GDR picture slice_layer_rbsp( ) | VCL |

TABLE 2-continued

NAL unit types in VVC

| nal_unit_type | Name of nal_unit_type | Content of NAL unit and RBSP syntax structure | NAL unit type class |
|---|---|---|---|
| 11 | RSV_IRAP_11 | Reserved IRAP VCL NAL unit types | VCL |
| 12 | RSV_IRAP_12 | | |
| 13 | DPS_NUT | Decoding parameter set decoding_parameter_set_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 | PREFIX_APS_NUT | Adaptation parameter set adaptation_parameter_set_rbsp( ) | non-VCL |
| 18 | SUFFIX_APS_NUT | | |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 | PREFIX_SEI_NUT | Supplemental enhancement information sei_rbsp( ) | non-VCL |
| 24 | SUFFIX_SEI_NUT | | |
| 25 | FD_NUT | Filler data filler_data_rbsp( ) | non-VCL |
| 26 | RSV_NVCL_26 | Reserved non-VCL NAL unit types | non-VCL |
| 27 | RSV_NVCL_27 | | |
| 28 . . . 31 | UNSPEC_28 . . . UNSPEC_31 | Unspecified non-VCL NAL unit types | non-VCL |

For single layer coding in HEVC, an access unit (AU) is the coded representation of a picture, which may consist of several video coding layer (VCL) NAL units as well as non-VCL NAL units. A coded video sequence (CVS) in HEVC is a series of access units starting at an intra random access point (IRAP) access unit up to, but not including the next IRAP access unit in decoding order. The decoding order is the order in which NAL units shall be decoded, which is the same as the order of the NAL units within the bitstream. The decoding order may be different from the output order, which is the order in which decoded pictures are to be output, such as for display, by the decoder.

Non-VCL NAL units are NAL units that do not carry coded sample values directly, such as for example parameter sets. Both VVC and HEVC define picture parameter set (PPS) and sequence parameter set (SPS), which contain parameters valid for a picture or a sequence respectively. In HEVC there is another parameter set; video parameter set (VPS) that contains information valid for several layers. A new VPS can only be activated at the start of a new CVS. When VVC is finalized it may or may not include a VPS or similar.

The first byte of each NAL unit in VVC and HEVC contains the nal_unit_type syntax element. A decoder or bitstream parser can conclude how the NAL unit should be handled, e.g. parsed and decoded, after looking at the first byte.

Temporal Layers

In HEVC and in the current version of VVC, all pictures are associated with a TemporalId value which specified what temporal layer the picture belongs to. TemporalId values are decoded from the nuh_temporal_id_plus1 syntax element in the NAL unit header. In HEVC, the encoder is required to set TemporalId values such that pictures belonging to a lower layer is perfectly decodable when higher temporal layers are discarded. Assume for instance that an encoder has output a bitstream using temporal layers 0, 1 and 2. Then removing all layer 2 NAL units or removing all layer 1 and 2 NAL units will result in bitstreams that can be decoded without problems. This is ensured by restrictions in the HEVC/VVC specification that the encoder must comply with. For instance, it is not allowed for a picture of a temporal layer to reference a picture of a higher temporal layer.

Layers, Dependent and Independent Layers

Layers are defined in VVC as a set of VCL NAL units that all have a particular value of nuh_layer_id and the associated non-VCL NAL units.

A layer access unit in VVC is defined as a set of NAL units for which the VCL NAL units all have a particular value of nuh_layer_id, that are associated with each other according to a specified classification rule, that are consecutive in decoding order, and that contain exactly one coded picture.

A coded layer video sequence (CLVS) in the current version of VVC is defined as a sequence of layer access units that consists, in decoding order, of a CLVS layer access unit, followed by zero or more layer access units that are not CLVS layer access units, including all subsequent layer access units up to but not including any subsequent layer access unit that is a CLVS layer access unit. The relation between the layer access units and coded layer video sequences is illustrated in FIG. 1. In the current version of VVC, layers may be coded independently or dependently from each other. When the layers are coded independently, a layer with e.g. nuh_layer_id 0 may not predict video data from another layer with e.g. nuh_layer_id 1. In the current version of VVC, dependent coding between layers may be used, which enables support for scalable coding with SNR, spatial and view scalability Picture Header The current VVC draft includes a picture header, which is a NAL unit having nal_unit_type equal to PH_NUT. The picture header is similar to the slice header, but the values of the syntax elements in the picture header are used to decode all slices of one picture. Each picture in VVC consist of one picture header NAL unit followed by all coded slices of the picture where each coded slice is conveyed in one coded slice NAL unit.

VVC Block Structure

The draft VVC video coding standard uses a block structure referred to as quadtree plus binary tree plus ternary tree block structure (QTBT+TT) where each picture is first partitioned into square blocks called coding tree units (CTU). The size of all CTUs are identical and the partition is done without any syntax controlling it. Each CTU is further partitioned into coding units (CU) that can have either square or rectangular shapes. The CTU is first partitioned by a quad tree structure, then it may be further partitioned with equally sized partitions either vertically or horizontally in a binary structure to form coding units (CUs). A block could thus have either a square or rectangular shape. The depth of the quad tree and binary tree can be set by the encoder in the bitstream. An example of dividing a CTU using QTBT is illustrated in FIGS. 1A and 1B. The ternary tree (TT) part adds the possibility to divide a CU into three partitions instead of two equally sized partitions; this increases the possibilities to use a block structure that better fits the content structure in a picture.

Parameter Sets

HEVC specifies three types of parameter sets, the picture parameter set (PPS), the sequence parameter set (SPS) and the video parameter set (VPS). The PPS contains data that is common for a whole picture, the SPS contains data that is common for a coded video sequence (CVS) and the VPS contains data that is common for multiple CVSes.

VVC also uses these parameter set types. In VVC, there is also the adaptation parameter set (APS) and the decoding parameter set (DPS). The APS may contain information that can be used for multiple slices and two slices of the same picture can use different APSes. The DPS consist of information specifying the "worst case" in terms of profile and level that the decoder will encounter in the entire bitstream.

Slices

The concept of slices in HEVC divides the picture into independently coded slices, where decoding of one slice in a picture is independent of other slices of the same picture. Different coding types could be used for slices of the same picture, i.e. a slice could either be an I-slice, P-slice or B-slice. One purpose of slices is to enable resynchronization in case of data loss. In HEVC, a slice is a set of CTUs.

In the current version of VVC, a picture may be partitioned into either raster scan slices or rectangular slices. A raster scan slice consists of a number of complete tiles in raster scan order. A rectangular slice consists of a group of tiles that together occupy a rectangular region in the picture or a consecutive number of CTU rows inside one tile. Each slice comprises a slice header and coded slice data. The has a slice header comprising syntax elements. Decoded slice header values from these syntax elements are used when decoding the slice. Each slice is carried in one VCL NAL unit.

In a previous version of the VVC draft specification, slices were referred to as tile groups.

Tiles

The draft VVC video coding standard includes a technique called tiles that divides a picture into rectangular spatially independent regions. Tiles in the draft VVC coding standard are very similar to the tiles used in HEVC. Using tiles, a picture in VVC can be partitioned into rows and columns of samples where a tile is an intersection of a row and a column. FIG. 2 below shows an example of a tile partitioning using 4 tile rows and 5 tile columns resulting in a total of 20 tiles for the picture.

The tile structure is signaled in the picture parameter set (PPS) by specifying the thicknesses of the rows and the widths of the columns. Individual rows and columns can have different sizes, but the partitioning always span across the entire picture, from left to right and top to bottom respectively.

There is no decoding dependency between tiles of the same picture. This includes intra prediction, context selection for entropy coding and motion vector prediction. One exception is that in-loop filtering dependencies are generally allowed between tiles.

In the rectangular slice mode in VVC, a tile can further be split into multiple slices where each slice consists of a consecutive number of CTU rows inside one tile. FIG. 3 shows an example of a tile partitioning and a rectangular slice partitioning using the tile partitioning in VVC.

Merging the Picture Header and Slice Header

VET input contributions JVET-Q0255-v1.zip and JVET-Q0426-v2.zip both proposes to merge the picture header and slice header. Both contributions propose to make the picture header (PH) optional, claiming BDR-savings and they both propose to carry the syntax of the PH, slice header and slice data in a single VCL NAL unit when PH is not present. The design differences between JVET-Q0255 and JVET-Q0426 can be summarized as: use a currently reserved NAL unit type for a new VCL NAL unit containing both PH and slice header (JVET-Q0255) or use the current VCL NAL unit types with added flags (JVET-Q0426); restrict CLVS to either use PH for all pictures or for no picture (JVET-Q0426) or allow a mix (JVET-Q0255); restrict each picture to consist of one slice when PH is not present (JVET-Q0255) or allow multiple slices without PH (JVET-Q0426).

The JVET-Q0255-v1.zip contribution proposes the following content in the new NAL unit type:

TABLE 3

|  | Descriptor |
| --- | --- |
| picture_layer_rbsp( ) { | |
| pic_nal_type | u(4) |
| picture_header_rbsp( ) | |
| slice_header( ) | |
| slice_data( ) | |
| } | | pic_nal_type indicates the corresponding Nal Unit type of the picture.

The value of NalType is derived as follows:

NalType=(*nal*_unit_type==CODED*PIC*)?pic_nal_type:*nal*_unit_type

The JVET-Q0426-v2.zip contribution proposes the following for the slice header:

TABLE 4

|  | Descriptor |
| --- | --- |
| slice_header( ) { | |
| if( !sps_picture_header_enabled_flag ) | |
| first_vcl_nal_unit_in_picture_flag | u(1) |
| slice_pic_order_cnt_lsb | u(v) |
| if( subpics_present_flag ) | |
| slice_subpic_id | u(v) |

TABLE 4-continued

| | Descriptor |
|---|---|
| if( rect_slice_flag \|\| NumTilesInPic > 1 ) | |
|   slice_address | u(v) |
| if( !rect_slice_flag && NumTilesInPic > 1 ) | |
|   num_tiles_in_slice_minus1 | ue(v) |
| slice_type | ue(v) |
| if( !sps_picture_header_enabled_flag ) { | |
|   slice_pic_parameter_set_id | ue(v) |
|   common_slice_header_struct( 0 ) | |
| } | |
| ... | |

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 4 is an illustration of an example of a tile partitioning and a rectangular slice partitioning using the tile partitioning in VVC;

FIG. 6 is a block diagram illustrating an encoder according to some embodiments of inventive concepts;

FIG. 7 is a block diagram illustrating a decoder according to some embodiments of inventive concepts;

FIGS. 8A, 8B, 9A, 9B, and 10 are flow charts illustrating operations of a decoder according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
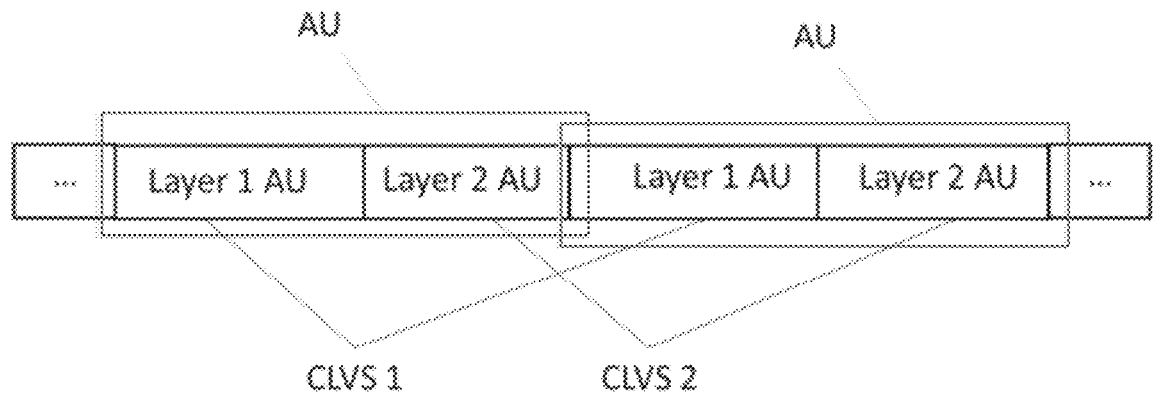
FIG. 1 is a diagram illustrating a relation between layer access units and coded layer video sequences according to some embodiments.
Figure 2A:
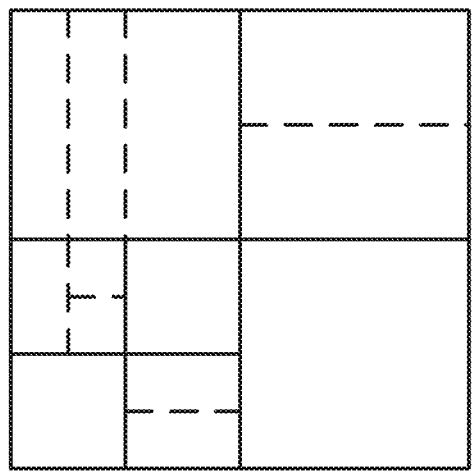
FIG. 2A is an illustration of an example of partitioning a CTU into CUs using QTBT.
Figure 2B:
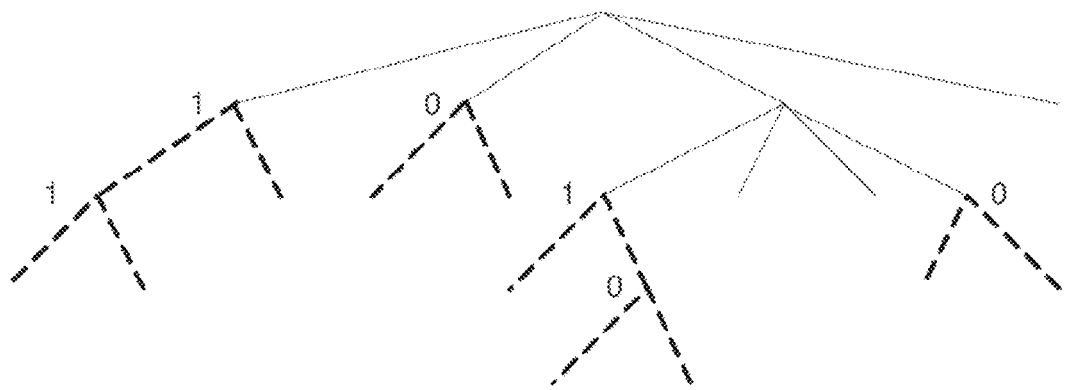
FIG. 2B is an illustration of an example of partitioning a CTU into CUs using QTBT
Figure 3:
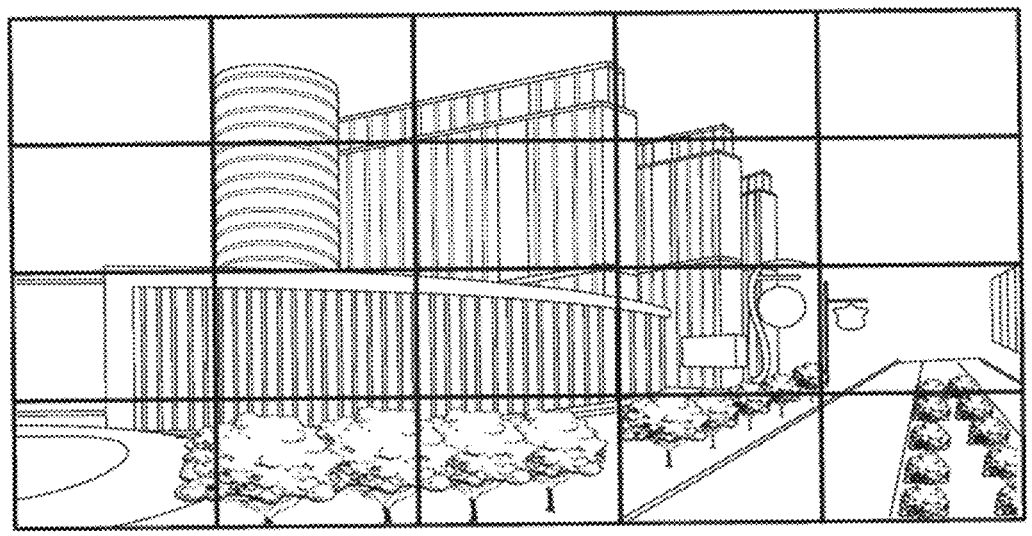
FIG. 3 is an illustration of an example of tile partitioning of a picture.
Figure 5:
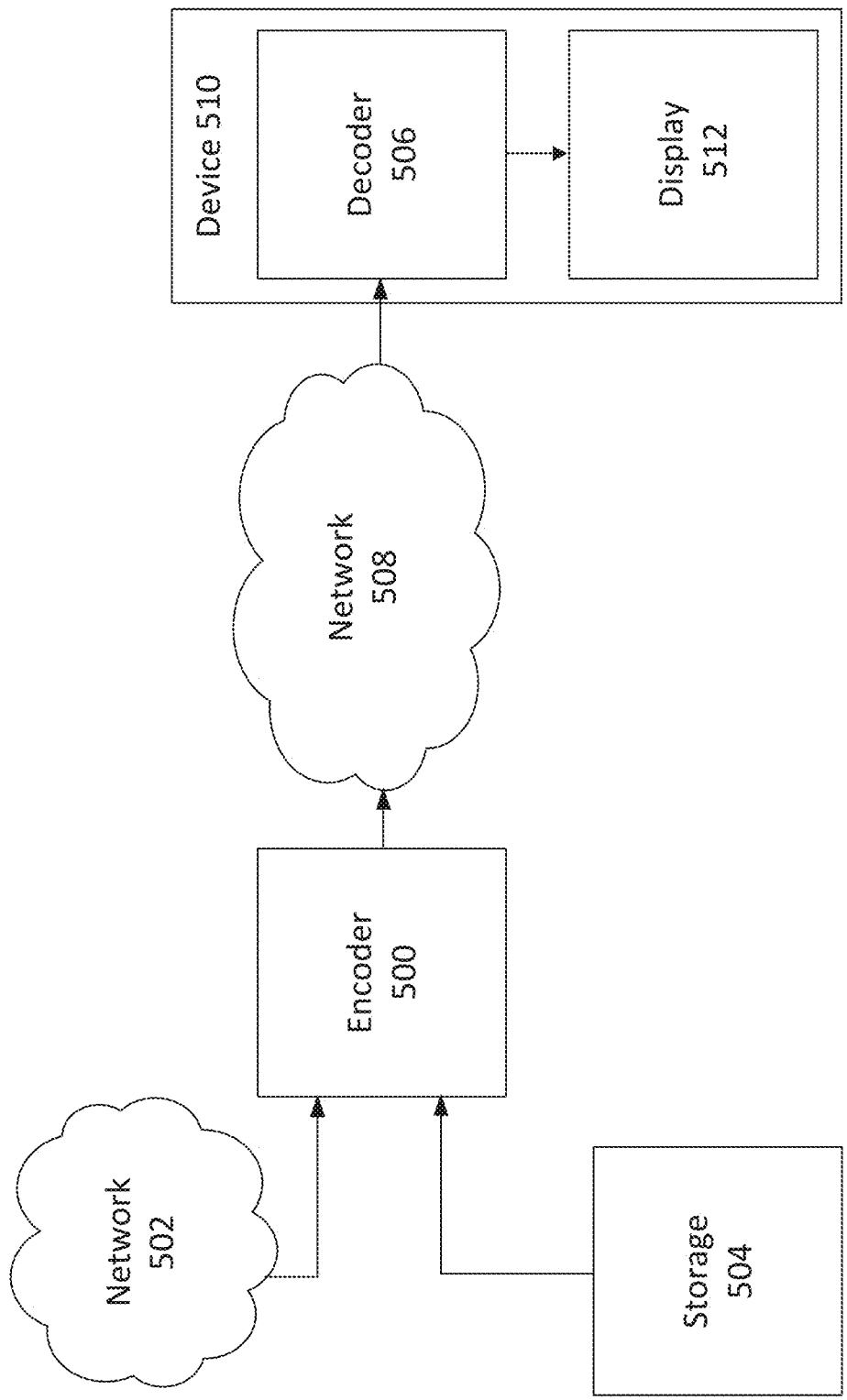
FIG. 5 is a block diagram illustrating an operating environment according to some embodiments of inventive concepts.

FIG. 5 illustrates an example of an operating environment of an encoder 500 that may be used to encode bitstreams as described herein. The encoder 500 receives media from network 502 and/or from storage 504 and encodes the media into bitstreams as described below and transmits the encoded media to decoder 506 via network 508. Storage device 504 may be part of a storage depository of videos such as a storage repository of a store or a streaming video service, a separate storage component, a component of a mobile device, etc. The decoder 506 may be part of a device 510 having a display 512. The device 510 may be a mobile device, a set-top device, a head-mounted display, and the like.

FIG. 6 is a block diagram illustrating elements of encoder 500 configured to encode video frames according to some embodiments of inventive concepts. As shown, encoder 500 may include network interface circuitry 605 (also referred to as a network interface) configured to provide communications with other devices/entities/functions/etc. The encoder 500 may also include processor circuitry 601 (also referred to as a processor) coupled to the network interface circuitry 605, and a memory circuitry 603 (also referred to as a memory) coupled to the processor circuit. The memory circuitry 603 may include computer readable program code that when executed by the processor circuitry 601 causes the processor circuit to perform operations according to embodiments disclosed herein.

According to other embodiments, processor circuitry 601 may be defined to include memory so that a separate memory circuit is not required. As discussed herein, operations of the encoder 500 may be performed by processor 601 and/or network interface 605. For example, processor 601 may control network interface 605 to transmit communications to decoder 506 and/or to receive communications through network interface 605 from one or more other network nodes/entities/servers such as other encoder nodes, depository servers, etc. Moreover, modules may be stored in memory 603, and these modules may provide instructions so that when instructions of a module are executed by processor 601, processor 601 performs respective operations.

FIG. 7 is a block diagram illustrating elements of decoder 506 configured to decode video frames according to some embodiments of inventive concepts. As shown, decoder 506 may include a network interface circuit 705 (also referred to as a network interface) configured to provide communications with other devices/entities/functions/etc. The decoder 506 may also include processor circuitry 701 (also referred to as a processor) coupled to the network interface circuit 705, and a memory circuit 703 (also referred to as memory) coupled to the processor circuit. The memory circuitry 703 may include computer readable program code that when executed by the processor circuitry 701 causes the processor circuit to perform operations according to embodiments disclosed herein.

According to other embodiments, processor circuitry 701 may be defined to include memory so that a separate memory circuit is not required. As discussed herein, operations of the decoder 506 may be performed by processor 701 and/or network interface 705. For example, processor 701 may control network interface 705 to receive communications from encoder 500. Moreover, modules may be stored in memory 703, and these modules may provide instructions so that when instructions of a module are executed by processor 701, processor 701 performs respective operations.

The problem with the JVET-Q0255 solution is that the JVET-Q0255 solution proposes to use a NAL unit type which is a precious resource. Additionally, JVET-Q0255 introduces a code word, pic_nal_type to carry the necessary part of nal_unit_type for the picture carried in the NAL unit. The cost of the syntax element is 4 bits per picture which might not sound much, but for a 100 kbps 50 fps video stream, 4 bits per picture is equivalent to a share of 0.2%. A share of 0.2% is significant. There are numerous design decisions made during video coding standardizations that have been made based upon a bit-saving of 0.2% or even less.

Another problem with JVET-Q0255 is that it does not support multiple slices per picture. which is an unnecessary limitation. Yet another problem with JVET-Q0255 is that it does not explain how detection of picture boundaries can be done by a decoder.

The design in JVET-Q0426 is that the value of the sps_picture_header_enabled_flag requires the slice to identify a picture parameter set (PPS) and then identify a sequence parameter set (SPS) from a syntax element value of the identified picture parameter set. A problem with this is that the syntax element that identifies a picture parameter set (slice_pic_parameter_set_id) comes after the value of sps_picture_header_enabled_flag is used, and that the syntax element is conditioned on the value of the sps_picture_header_enabled_flag. A possible solution could be to put slice_pic_parameter_set_id first in the slice header unconditionally. However, when there is a picture header in the bitstream for the picture containing the slice, the picture parameter set is identified from a syntax element in the picture header and having the same syntax element in both the picture header and slice header comes with a significant bit cost.

In some embodiments of inventive concepts, a state syntax element is added to the slice header. One value of the state syntax element specifies that there is a picture header for the picture comprising the slice. One other value of the state syntax element specifies that there is no picture header present for the picture comprising the slice. The state syntax element may be a one-bit syntax element flag.

In one embodiment of inventive concepts, the value that specifies that there is no picture header present for the picture comprising the slice additionally specifies that the picture consist of one single slice, meaning that multiple slices for that picture is not allowed.

In one embodiment of inventive concepts, mixing the value of the flag within a coded video stream (CVS) to coded layer video sequence (CLVS) may be allowed. This means that there may be one picture header for a first picture in a first CVS or CLVS, and then there may be a second picture in the first CVS or CLVS for which there is no picture header.

In one embodiment of inventive concepts, the mix is not allowed. In this embodiment, there is another separate state syntax element in a parameter set, and a requirement that the value of the state syntax element in the slice header shall express (or repeat) the meaning of the value of the state syntax element in the parameter set.

In one embodiment of inventive concepts, detection of the start of a coded picture in the bitstream is determined from finding a picture header or finding a NAL unit with the state syntax element having a value specifying that there is no picture header for the picture comprising the slice.

In one embodiment of inventive concepts, one value of the state syntax element specifies that there may or may not be a picture header present for the picture comprising the slice.

In one embodiment of inventive concepts, there is no state syntax element present in the slice header. Instead, the state value is derived from the existence of a picture header for the picture. If there is no picture header detected for the picture when the slice is decoded or parsed, the state is set equal to a value that specifies that there is no picture header for the picture comprising the slice. If there is a picture header detected for the picture before the slice is decoded or parsed, the state is set equal to a value that specifies that there is a picture header for the picture comprising the slice.

An advantage of using the above embodiments of inventive concepts is that no additional NAL unit type is used. Also, the pic_nal_type syntax element is not needed which saves 4 bits. Compared with JVET-Q0426, embodiments of the inventive concepts may solve one or more of the problems explained above.

In the embodiments of inventive concepts described below, a slice is a coded part of a picture which is signaled in its own NAL unit. A slice comprises coded slice data and a slice header, both signaled in the same NAL unit. One slice may or may not cover an entire picture.

In one version of inventive concepts, a slice is referred to as (taken from the VVC draft) an integer number of complete tiles or an integer number of consecutive complete CTU rows within a tile of a picture that are exclusively contained in a single NAL unit.

The term "set of common syntax elements" used in the embodiments of inventive concepts below is a set of one or more syntax elements that may be signaled either in a picture header or in a slice header.

In the embodiments of inventive concepts described below, the term "for the picture" is used with the meaning that the data, parameters, picture header etc., belongs to the picture being described. E.g. "the picture header for the picture" is the picture header associated with the specific picture. The picture header in this case preferably precedes the coded data of the picture.

In a first embodiment of inventive concepts, a state syntax element is added to the slice header. The state syntax element specifies whether there is a picture header or not for the picture comprising the slice. The state syntax element may be a one-bit syntax element flag. In one embodiment of the first embodiment, it is preferred that the flag is put early in the slice header. In alternative solutions of this embodiment of inventive concepts, the flag may instead be put in a parameter set such as an APS In this first embodiment of inventive concepts, a set of common syntax elements is used. One or more of the following rules based on the presence and location of the picture header and the set of common syntax elements for a current slice of a current picture may be used:

Rule 1. If the state syntax element value (the state value) in the current slice is equal to a first value, there shall not be any picture header for the current picture, and the set of common syntax elements shall be included in the slice header of the current slice.

Rule 2. If the state value in the current slice is equal to a second value, there shall be a picture header for the current picture. The picture header shall include the set of common syntax elements and no syntax element in the set of common syntax elements shall be present in the current slice.

Rule 3. If there is a picture header for the current picture, the picture header shall be located before the current slice in the same access unit or layer access unit as the current slice.

In a variant of the first embodiment of inventive concepts, if there are more than one slice in the current picture, the state syntax elements in all the slices in the current picture shall have the same state value. If the decoder receives multiple slices for a picture and the state value is not equal for all the slices in the picture, the decoder may conclude that the bitstream is not compliant with codec specification and may interpret that as a bit-error, loss of data or non-compliant bitstream or encoder. It may report the error, perform error concealment or take other actions based on the knowledge that the bitstream is not compliant.

A decoder may perform all or a subset of the following steps for decoding a current picture from a bitstream using this embodiment:

Step 1. The decoder decodes a state value from a state syntax element in a slice header of a current slice of the current picture that specifies whether picture headers are used or not for the current picture.

Step 2. If the state value is equal to a first value, the decoder deduces that there is no picture header for the current picture. The decoder decodes a set of syntax elements S from the slice header and uses the decoded values of the set S when decoding the current slice.

Step 3. If the state value is equal to a second value, the decoder deduces that there shall be a picture header for the current picture. The decoder decodes a set of syntax elements T from a picture header for the current picture and uses the decoded values of the set of syntax elements T (a.k.a., PH syntax structure or set of picture syntax elements) when decoding the current slice, where the set of picture syntax elements T contains the same syntax elements as the set S (i.e., the set of syntax elements S is also a PH syntax structure (set of picture syntax elements)).

Step 4. Optionally, the picture header for the current picture is decoded from a picture header NAL unit separate from the current slice NAL unit, wherein the picture header NAL unit precedes the current slice NAL unit in decoding order and the picture header NAL unit and the current slice NAL unit belongs to the same access unit or picture unit.

In a second embodiment of inventive concepts, multiple slices are not used.

In this second embodiment of inventive concepts, the value that specifies that there is no picture header present for the picture comprising the slice additionally specifies that the picture consist of one single slice, meaning that multiple slices for that picture is not allowed.

A decoder may perform all or a subset of the following steps for decoding a current picture from a bitstream using this embodiment:

Step 1. The decoder decodes a state value from a state syntax element in a slice header of a current slice of the current picture that specifies whether picture headers are used or not for the current picture.

Step 2. If the state value is equal to a first value, the decoder deduces that there is no picture header for the current picture. The decoder additionally deduces that the picture comprises of one single slice. The decoder decodes a set of syntax elements S from the slice header and uses the decoded values of the set S when decoding the current slice.

Step 3. If the state value is equal to a second value, the decoder deduces that there shall be a picture header for the current picture. The decoder decodes a set of syntax elements T from a picture header for the current picture and uses the decoded values of the set T when decoding the current slice, where the set T contains the same syntax elements as the set S.

Step 4. Optionally, the picture header for the current picture is decoded from a picture header NAL unit separate from the current slice NAL unit, wherein the picture header NAL unit precedes the current slice NAL unit in decoding order and the picture header NAL unit and the current slice NAL unit belongs to the same access unit or picture unit.

If the state value is equal to a first value and the decoder receives multiple slices for a picture, the decoder may conclude that the bitstream is not compliant with codec specification and may interpret that as a bit-error, loss of data or non-compliant bitstream or encoder. It may report the error, perform error concealment or take other actions based on the knowledge that the bitstream is not compliant.

In a third embodiment of inventive concepts, a mix of access units with and without picture headers is used.

In one embodiment of the third embodiment mixing the value of the flag (representing the state syntax element) within a CVS or CLVS is allowed. This means that there may be one picture header for a first picture in a first CVS or CLVS, and then there may be a second picture in the first CVS or CLVS for which there is no picture header.

In a fourth embodiment of inventive concepts, layer access units or layered access units in a CVS or CLVS may be restricted to either all have a picture header or none have a picture header In one embodiment of the fourth embodiment of inventive concepts, the mix of the flag values within a CVS or CLVS from the third embodiment is not allowed. This means that one of these two statements shall be true in a current CVS or CLVS: (1) There is a picture header for all picture in the current CVS or CLVS; (2) There are no picture headers in the current CVS or CLVS.

In this embodiment, there may be another separate state syntax element in a parameter set, e.g. DPS, SPS, PPS or APS, and a requirement that the value of the state syntax element in the slice header shall express (or repeat) the meaning of the value of the state syntax element in the parameter set.

The state syntax element may be a binary flag.

A decoder may perform all or a subset of the following steps for decoding a current picture from a bitstream using this embodiment:

Step 1. The decoder decodes a state value VA from a state syntax element SA in a parameter set in the bitstream, the value VA specifies whether coded video data of each picture in the bitstream is preceded with a picture header or not.

Step 2. The decoder decodes a state value VB from a state syntax element SB in a slice header of a current slice of the current picture that specifies whether picture headers are used or not for the current picture.

Step 3. If the state value VB is not equal to (or express the same meaning of) the state value VA, the decoder may conclude that the bitstream is not compliant with codec specification and may interpret that as a bit-error, loss of data or non-compliant bitstream or encoder. It may report the error, perform error concealment or take other actions based on the knowledge that the bitstream is not compliant.

Step 4. If the state value VB is equal to a first value, the decoder deduces that there is no picture header for the current picture. The decoder decodes a set of syntax elements S from the slice header and uses the decoded values of the set S when decoding the current slice.

Step 5. If the state value VB is equal to a second value, the decoder deduces that there shall be a picture header for the current picture. The decoder decodes a set of syntax elements T from a picture header for the current picture and uses the decoded values of the set T when decoding the current slice, where the set T contains the same syntax elements as the set S.

In a version of this embodiment, there is not another separate state syntax element. Instead there is a rule saying that all state syntax elements in the current CVS or CLVS shall have the same value. This also means that either there is a picture header for all pictures in the CVS or CLVS, or there is no picture header in the CVS or CLVS.

A decoder may perform all or a subset of the following steps using this version of the embodiment:

Step 1. The decoder decodes a state value VA from a state syntax element in a slice header of a slice of a first picture that specifies whether picture headers are used or not for the first picture.

Step 2. The decoder decodes a state value VB from a state syntax element in a slice header of a slice of a second picture that specifies whether picture headers are used or not for the second picture.

Step 3. If the state value VB is not equal to (or express the same meaning of) the state value VA, the decoder may conclude that the bitstream is not compliant with codec specification and may interpret that as a bit-error, loss of data or non-compliant bitstream or encoder. It may report the error, perform error concealment or take other actions based on the knowledge that the bitstream is not compliant.

Step 4. If the state value VA is equal to a first value, the decoder deduces that there is no picture header for the first picture. The decoder decodes a set of syntax elements S from the slice header and uses the decoded values of the set S when decoding the slice of the first picture.

Step 5. If the state value VA is equal to a second value, the decoder deduces that there shall be a picture header for the first picture. The decoder decodes a set of syntax elements T from a picture header for the first picture and uses the decoded values of the set T when decoding the slice of the first picture, where the set T contains the same syntax elements as the set S.

A picture header may refer to a picture header NAL unit, such that either there is a picture header NAL unit for all pictures in the CVS or CLVS, or there is no picture header NAL unit in the CVS or CLVS.

In a fifth embodiment, detection of the start of a coded picture is provided.

In this fifth embodiment, the start of a coded picture in the bitstream is determined from finding a picture header or finding a NAL unit with the state syntax element having a value specifying that there is no picture header for the picture comprising the slice.

In one variant of this embodiment, a decoder may perform the following steps to determine the first VCL NAL unit of a picture. The steps are repeated until the process is stopped.

Step 1. The decoder acquires a current NAL unit from the bitstream.

Step 2. The decoder determines if the current NAL unit is a picture header NAL unit or if the current NAL unit is a VCL NAL unit Step 3. If the current NAL unit is a picture header NAL unit, the decoder determines that the first VCL NAL unit of the picture is the VCL NAL unit that follows the current NAL unit in decoding order and stops, otherwise Step 4. If the current NAL unit is a VCL NAL unit, the decoder checks the state syntax element value in the current NAL unit and if the state syntax element value is equal to a value specifying that there is no picture header for the picture comprising the slice, the decoder determines that the first VCL NAL unit of the picture is the current NAL unit and stops, otherwise Step 5. The decoder acquires the next NAL unit in decoding order as a new current NAL unit and continues at step 2.

In a variant of this embodiment, the state syntax element may have a third state value that specifies the start of a coded picture in the bitstream. In one example of this embodiment, a first value of the state syntax element specifies that the picture header is not used for the current picture, a second value of the state syntax element specifies that the picture header is used for the current picture and a third value of the state syntax element specifies that the picture header is not used for the current picture and specifies the start of a coded picture in the bitstream.

Now that the various embodiments of inventive concepts have been described, operations a decoder executes to perform the various embodiments of inventive concepts shall be described. Turning to FIGS. 8A and 8B, operations of the decoder 506 (implemented using the structure of the block diagram of FIG. 7) will now be discussed with reference to the flow chart of FIGS. 8A-8B according to some embodiments of inventive concepts. For example, modules may be stored in memory 705 of FIG. 7, and these modules may provide instructions so that when the instructions of a module are executed by respective wireless device processing circuitry 703, processing circuitry 703 performs respective operations of the flow chart.

In block 801, the processing circuitry 703 may decode a first state value from a first state syntax element in a parameter set, the first state value specifying whether or not a second state value from a second state syntax element in all slice headers in a CVS of CLVS shall be the same for all picture headers. If the first state value does not indicate that the second state value from the second state syntax element shall be the same, each slice is decoded on its own.

In block 803, the processing circuitry 703 may determine whether the first state value indicates that the second state value from the second seat syntax element shall be the same for al picture headers.

Responsive to the first state value indicating that the second state value from the second stat syntax element shall be the same, the processing circuitry 73 may, in block 805, decode a second state value from a second state syntax element in a slice header of a first picture, the second state value specifying whether or not picture headers are used for the first picture.

In block 807, responsive to the state value for the first picture being a first value the processing circuitry 703 may deduce that there is no picture header for the current picture. In block 809, the processing circuitry 703 may decode a first set of syntax elements for the slice header to obtain decoded values of the first set of syntax elements. In block 811, the processing circuitry 703 may use the decoded values of the first set of syntax elements to decode the slice of the first picture.

In block 813, the processing circuitry 703 may, responsive to the state value being a second value, deduce that there is a picture header for the current picture. In block 815, the processing circuitry 703 may decode a second set of syntax elements for the slice header to obtain decoded values of the second set of syntax elements. In block 817, the processing circuitry 703 may use the decoded values of the second set of syntax elements to decode the current slice of the first picture, wherein the second set of syntax element contains the same syntax elements as the first set of syntax elements.

In block 819, the processing circuitry 703 may decode a second state value from a second state syntax element in a slice header of a second picture, the second state value specifying whether or not picture headers are used for the second current picture.

In block 821, responsive to the second state value being a second value. the processing circuitry 703 may deduce that there is a picture header for the second picture. In block 823, the processes circuitry 703 may decode a second set of syntax elements for the second picture to obtain decoded values of the second set of syntax elements. In block 825, the processing circuitry 703 may use the decoded values of the second set of syntactic elements to decode the slice of the second picture.

The processing circuitry 703 may, responsive to the state value being the first value, deduce that the picture contains a single slice. In an embodiment, the processing circuitry 703 may, responsive to the state value being the first value, perform an action responsive to receiving multiple slices for the current picture. In one embodiment, performing the action comprises determining that the bitstream is not compliant with a codec specification. In another embodiment, performing the action includes determining that a bit error has occurred and reporting the bit error responsive to determining that the bit error has occurred. In a further embodiment, in performing the action, the processing circuitry 703 may determine that a bit error has occurred. Processing circuitry 703 may determine that a loss of data has occurred. The processing circuitry 703 may perform error concealment responsive determining that a loss of data has occurred. In another embodiment, performing the action includes determining that the encoder is a non-compliant encoder.

Various operations from the flow chart of FIG. 8 may be optional with respect to some embodiments of decoders and related methods. Regarding methods of example embodiment 1 (set forth below), for example, operations of blocks 801, 803, 819, 821, 823, and 825 of FIGS. 8A and 8B may be optional.

Figure 9B:
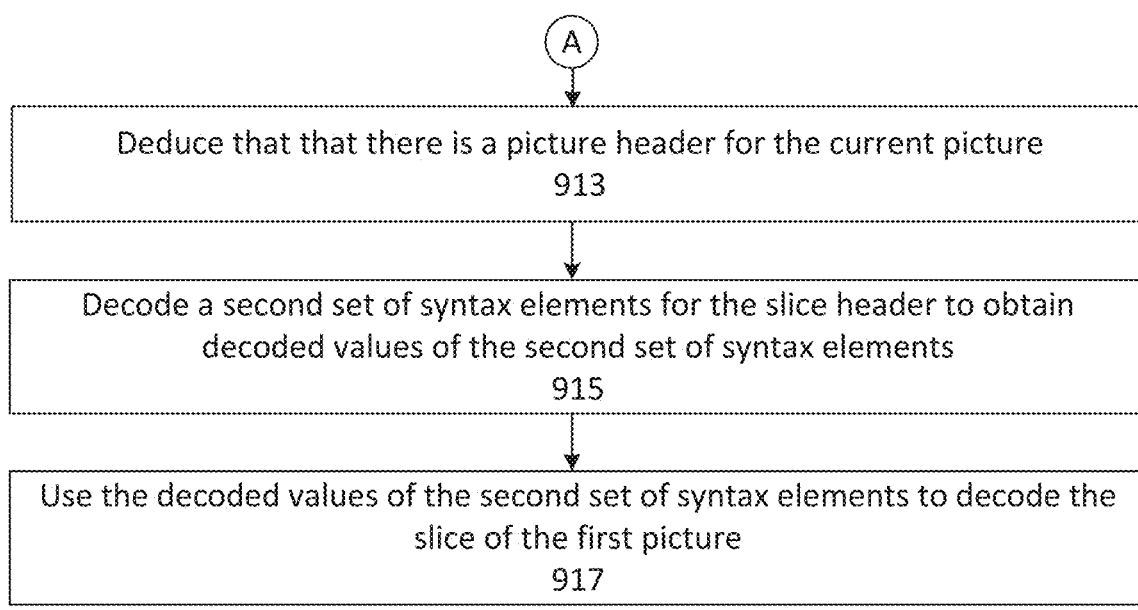

In another embodiment of inventive concepts described above, there may be a rule saying that all state syntax elements in the current CVS or CLVS shall have the same value. Turning now to FIGS. 9A and 9B, In block 901, the processing circuitry 703 may decode a first state value from a first state syntax element in a slice header of a slice of a first picture, the first state value specifying whether or not picture headers are used for the first picture. In block 903, the processing circuitry 703 may decode a second state value from a first date syntax element in a slice header of a second picture, the second state value specifying whether or not picture headers are used for the second picture.

Responsive to the second state value not expressing a same meaning as the first date value, the processing circuitry 703 may determine in block 905 that the bitstream is not compliant with a codex specification and may perform an action. The processing circuitry 703 may perform the same actions as indicated above.

Responsive to the second state value expressing a same meaning as the first state value and responsive to the state value being a first value, the processing circuitry 703 may deduce that there is no picture header for the current picture in block 907. In block 909, the processing circuitry 703 may decode a first set of syntax elements for the slice header to obtain decoded values of the first set of syntax elements. In block 911, the processing circuitry 703 may use the decoded values of the first set of syntax elements to decode the current slice of the current picture.

Responsive to the second state value expressing a same meaning as the first state value and responsive to the state value being a second value, the processing circuitry 703 may deduce that there is a picture header for the current picture in block 913. In block 915, the processing circuitry 703 may decode a second set of syntax elements for the slice header to obtain decoded values of the second set of syntax elements. The second set of syntax elements may be the same element as the first set of syntax elements. In block 917, the processing circuitry 703 may use the decoded values of the second set of syntax elements to decode the current slice of the current picture.

Figure 10:
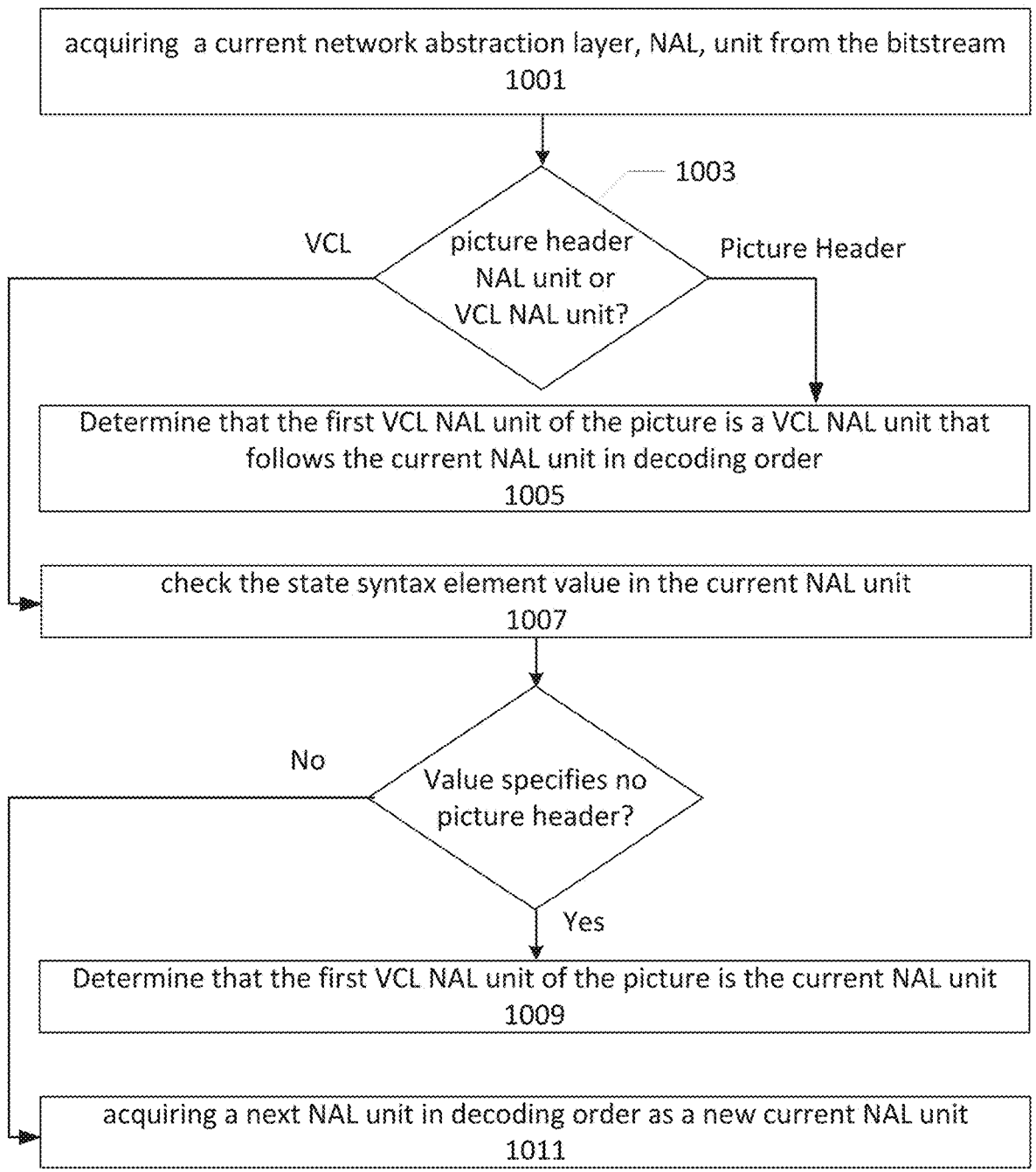

As indicated above, the start of a coded picture in the bitstream is determined from finding a picture header or finding a NAL unit with the state syntax element having a value specifying that there is no picture header for the picture comprising the slice. Turning to FIG. 10, in block 1001, the processing circuitry 703 may acquire a network abstract layer (NAL) unit from the bitstream. In block 1003, the processing circuitry 703 may determine whether the current NAL unit is a picture header NAL unit or if the current NAL unit is a video coding layer (VCL) NAL unit.

In block 1005, the processing unit 703 may, responsive to the current NAL unit being a picture header NAL unit, determine that that the first VCL NAL unit of the picture is a VCL NAL unit that follows the current NAL unit in decoding order.

Responsive to the current NAL unit being a VCL NAL unit, the processing circuitry 703 may check the status syntax element value in the current NAL unit and if the state syntax element value is equal to a value specifying that there is no picture header for the picture comprising the slice, determine in block 1009 that the first VCL NAL unit of the picture is the current NAL unit.

Responsive to the current NAL unit not being a picture header NAL unit or the current NA unit being a VCL NAL unit, and if the state syntax element value is not equal to a value specifying that there is no picture header for the picture comprising the slice, acquire in block 1011 a next NAL unit in decoding order as a new current NAL unit.

Operations of an encoder 500 (implemented using the structure of FIG. 6) will now be discussed with reference to the flow chart of FIG. 11 according to some embodiments of inventive concepts. For example, modules may be stored in memory 605 of FIG. 6, and these modules may provide instructions so that when the instructions of a module are executed by respective encoder processing circuitry 603, processing circuitry 603 performs respective operations of the flow chart.

Figure 11:
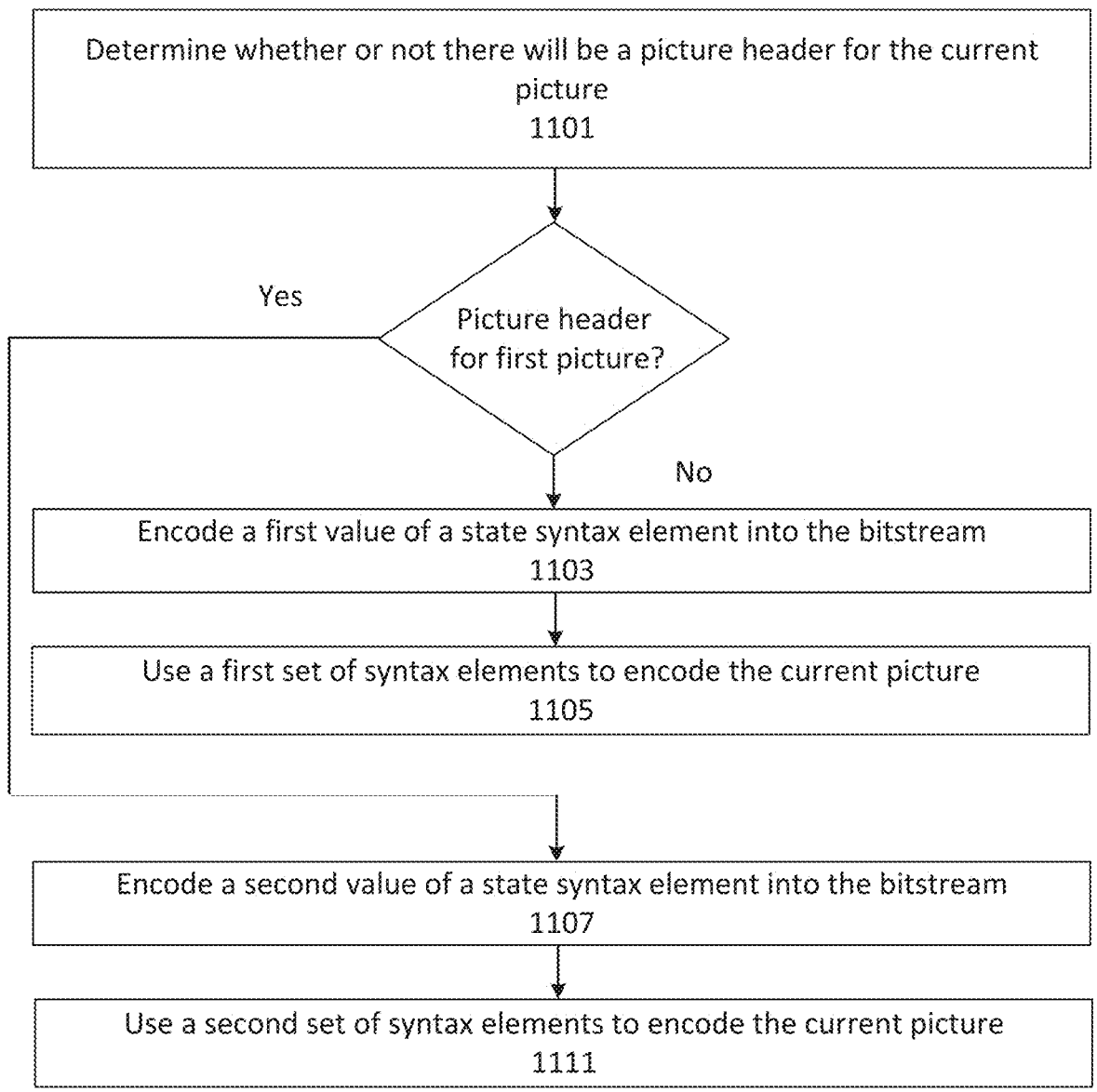
FIG. 11 is a flow chart illustrating operations of an encoder according to some embodiments of inventive concepts.

Turning to FIG. 11, in block 1101, the processing circuitry 603 may determine whether or not there will be a picture header for the current picture. Responsive to deciding that there will not be a picture header for the current picture, the processing circuitry 603 may, in block 1103, encode a first value of a state syntax element into the bitstream. The state syntax element may be encoded in a slice of the current picture or in a parameter set. In block 1105, the processing circuitry 603 may use a first set of syntax elements to encode the current picture.

Responsive to deciding that there will be a picture header for the current picture block, in block 1107, the processing circuitry 603 may encode a second value of the state syntax element into the bitstream. In block 1109, the processing circuitry 603 may use a second set of syntax elements to encode the current picture.

Example embodiments are discussed below.

A1. A method of decoding a current picture from a bitstream, the method comprising: decoding (805) a state value from a state syntax element in a slice header of a current slice of the current picture, the state value specifying whether or not picture headers are used for the current picture; responsive to the state value being a first value: deducing (807) that that there is no picture header for the current picture; and decoding (809) a first set of syntax elements for the slice header to obtain decoded values of the first set of syntax elements; using (811) the decoded values of the first set of syntax elements to decode the current slice of the current picture; responsive to the state value being a second value: deducing (813) that there is a picture header for the current picture; and decoding (815) a second set of syntax elements for the slice header to obtain decoded values of the second set of syntax elements; and using (817) the decoded values of the second set of syntax elements to decode the current slice of the current picture, wherein the second set of syntax elements contains same syntax elements as the first set of syntax elements.

A2. The method of Embodiment A1, further comprising: responsive to the state value being the first value: deducing that the picture contains a single slice.

A3. The method of any of Embodiments A1-A2, further comprising: responsive to the state value being the first value: responsive to receiving multiple slices for the current picture, performing an action.

A4. The method of Embodiment A3, wherein performing the action comprises: determining that the bitstream is not compliant with a codec specification.

A5. The method of Embodiment A3, wherein performing the action comprises: determining that that a bit error has occurred; and reporting the bit error responsive to determining that the bit error has occurred.

A6. The method of Embodiment A3, wherein performing the action comprises: determining that a loss of data has occurred; and performing error concealment responsive to determining that a loss of data has occurred.

A7. The method of Embodiment A3, wherein performing the action comprises: determining that the encoder is a non-compliant decoder.

A8. A method of decoding a plurality of pictures from a bitstream, the method comprising: decoding (801) a first state value from a first state syntax element in a parameter set, the first state value specifying whether or not a second state value from a second state syntax element in all slice headers in a coded video stream, CVS, or coded layer video sequence, CVLS, shall be the same for all picture headers; responsive to the first state value indicating that the second state value from the second state syntax element shall be the same (803): decoding (805) a second state value from a second state syntax element in a slice header of a first picture, the second state value specifying whether or not picture headers are used for the first picture; responsive to the state value for the first picture being a first value: deducing (807) that that there is no picture header for the current picture; decoding (809) a first set of syntax elements for the slice header to obtain decoded values of the first set of syntax elements; and using (811) the decoded values of the first set of syntax elements to decode the slice of the first picture; decoding (819) a second state value from a second state syntax element in a slice header of a second picture, the second state value specifying whether or not picture headers are used for the current picture; responsive to the second state value being a second value: deducing (821) that that there is a picture header for the second picture; and decoding (823) a second set of syntax elements for the second picture to obtain decoded values of the second set of syntax elements; and using (825) the decoded values of the second set of syntax elements to decode the slice of the second picture.

A9. A method of decoding a plurality of pictures from a bitstream, the method comprising: decoding (901) a first state value from a first state syntax element in a slice header of a slice of a first picture, the first state value specifying whether or not picture headers are used for the first picture; decoding (903) a second state value from a first state syntax element in a slice header of a slice of a second picture, the second state value specifying whether or not picture headers are used for the second picture; responsive to the second state value not expressing a same meaning as the first state value, determining (905) that the bitstream is not compliant with a codec specification and performing an action; responsive to the second state value expressing a same meaning as the first state value: responsive to the state value being a first value: deducing (907) that that there is no picture header for the current picture; and decoding (909) a first set of syntax elements for the slice header to obtain decoded values of the first set of syntax elements; and using (911) the decoded values of the first set of syntax elements to decode the current slice of the current picture; responsive to the state value being a second value: deducing (913) that that there is a picture header for the current picture; decoding (915) a second set of syntax elements for the slice header to obtain decoded values of the second set of syntax elements; and using (917) the decoded values of the second set of syntax elements to decode the current slice of the current picture, wherein the second set of syntax elements contains same syntax elements as the first set of syntax elements.

A10. A method of decoding a plurality of pictures from a bitstream, the method comprising: acquiring (1001) a current network abstraction layer (NAL) unit from the bitstream; determining (1003) whether the current NAL unit is a picture header NAL unit or if the current NAL unit is a video coding layer (VCL) NAL unit; responsive to the current NAL unit being a picture header NAL unit, determining (1005) that the first VCL NAL unit of the picture is a VCL NAL unit that follows the current NAL unit in decoding order; responsive to the current NAL unit being a VCL NAL unit, checking (1007) the state syntax element value in the current NAL unit and if the state syntax element value is equal to a value specifying that there is no picture header for the picture comprising the slice, determining (1009) that the first VCL NAL unit of the picture is the current NAL unit; and responsive to the current NAL unit not being a picture header NAL unit or the current NAL unit being a VCL NAL unit, and if the state syntax element value is not equal to a value specifying that there is no picture header for the picture comprising the slice, acquiring (1011) a next NAL unit in decoding order as a new current NAL unit.

A11. A decoder (506) for a communication network, the decoder (506) comprising: a processor (701); and memory (703) coupled with the processor, wherein the memory comprises instructions that when executed by the processor cause the processor to perform operations comprising: decoding (805) a state value from a state syntax element in a slice header of a current slice of the current picture, the state value specifying whether or not picture headers are used for the current picture; responsive to the state value being a first value: deducing (807) that that there is no picture header for the current picture; decoding (809) a first set of syntax elements for the slice header to obtain decoded values of the first set of syntax elements; and using (811) the decoded values of the first set of syntax elements to decode the current slice of the current picture; responsive to the state value being a second value: deducing (813) that that there is a picture header for the current picture; decoding (815) a second set of syntax elements for the slice header to obtain decoded values of the second set of syntax elements; and using (817) the decoded values of the second set of syntax elements to decode the current slice of the current picture, wherein the second set of syntax elements contains same syntax elements as the first set of syntax elements.

A12. The decoder of Embodiment A11, wherein the memory (503) comprises further instructions that when executed by the processor (501) cause the processor (501) to perform operations according to any of Embodiments A2-A7.

A13. A computer program product comprising computer-executable instructions configured to, when the computer-executable instructions are executed on a processor (501) comprised in a device (306), cause the device (306) to perform operations comprising: decoding (805) a state value from a state syntax element in a slice header of a current slice of the current picture, the state value specifying whether or not picture headers are used for the current picture; responsive to the state value being a first value: deducing (807) that that there is no picture header for the current picture; and decoding (809) a first set of syntax elements for the slice header to obtain decoded values of the first set of syntax elements; and using (811) the decoded values of the first set of syntax elements to decode the current slice of the current picture; responsive to the state value being a second value: deducing (813) that there is a picture header for the current picture; and decoding (815) a second set of syntax elements for the slice header to obtain decoded values of the second set of syntax elements; and using (817) the decoded values of the second set of syntax elements to decode the current slice of the current picture, wherein the second set of syntax elements contains same syntax elements as the first set of syntax elements.

A14. The computer program product of Embodiment A13 comprising further computer-executable instructions configured to, when the computer-executable instructions are executed on a processor comprised in the device (506), cause the device (506) to perform the method according to any one of Embodiments A2-A7.

A15. A computer program product comprising a computer-readable storage medium, the computer-readable storage medium having computer-executable instructions configured to, when the computer-executable instructions are executed on a processor comprised in a device (306), cause the device (306) to perform operations comprising: decoding (805) a state value from a state syntax element in a slice header of a current slice of the current picture, the state value specifying whether or not picture headers are used for the current picture; responsive to the state value being a first value: deducing (807) that that there is no picture header for the current picture; and decoding (809) a first set of syntax elements for the slice header to obtain decoded values of the first set of syntax elements; and using (811) the decoded values of the first set of syntax elements to decode the current slice of the current picture; responsive to the state value being a second value: deducing (813) that there is a picture header for the current picture; and decoding (815) a second set of syntax elements for the slice header to obtain decoded values of the second set of syntax elements; and using (817) the decoded values of the second set of syntax elements to decode the current slice of the current picture, wherein the second set of syntax elements contains same syntax elements as the first set of syntax elements.

A16. The computer program product of Embodiment A15 having further computer-executable instructions configured to, when the further computer-executable instructions are executed on a processor (501) comprised in the device (306), cause the device (306) to perform the method according to any one of Embodiments A2-A7.

A17. A method of encoding a current picture into a bitstream, the method comprising: determining (1101) whether or not there will be a picture header for the current picture; responsive to deciding that there will not be a picture header for the current picture: encoding (1103) a first value of a state syntax element into the bitstream; and using (1105) a first set of syntax elements to encode the current picture; responsive to deciding that there will be a picture header for the current picture: encoding (1107) a second value of the state syntax element into the bitstream; and using (1109) a second set of syntax elements to encode the current picture.

A18. An encoder for a communication network, the encoder comprising: a processor (501); and memory (503) coupled with the processor, wherein the memory comprises instructions that when executed by the processor cause the processor to perform operations comprising: determining (1101) whether or not there will be a picture header for the current picture; responsive to deciding that there will not be a picture header for the current picture: encoding (1103) a first value of a state syntax element into the bitstream; and using (1105) a first set of syntax elements to encode the current slice of the current picture; responsive to deciding that there will be a picture header for the current picture: encoding (1107) a second value of the state syntax element into the bitstream; and using (1109) a second set of syntax elements to encode the current slice of the current picture.

A19. A computer program product comprising computer-executable instructions configured to, when the computer-executable instructions are executed on a processor comprised in a device (500), cause the device (500) to perform operations comprising: determining (1101) whether or not there will be a picture header for the current picture; responsive to deciding that there will not be a picture header for the current picture: encoding (1103) a first value of a state syntax element into the bitstream; and using (1105) a first set of syntax elements to encode the current slice of the current picture; responsive to deciding that there will be a picture header for the current picture: encoding (1107) a second value of the state syntax element into the bitstream; and using (1109) a second set of syntax elements to encode the current slice of the current picture.

A20. A computer program product comprising a computer-readable storage medium, the computer-readable storage medium having computer-executable instructions configured to, when the computer-executable instructions are executed on a processor comprised in a device (500), cause the device (500) to perform operations comprising: determining (1101) whether or not there will be a picture header for the current picture; responsive to deciding that there will not be a picture header for the current picture: encoding (1103) a first value of a state syntax element into the bitstream; and using (1105) a first set of syntax elements to encode the current slice of the current picture; responsive to deciding that there will be a picture header for the current picture: encoding (1107) a second value of the state syntax element into the bitstream; and using (1109) a second set of syntax elements to encode the current slice of the current picture.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s):

AU Access Unit
AUD Access Unit Delimiter
ALF Adaptive Loop Filter
APS Adaptive Parameter Set
BLA Broken Link Access
CLVS Coded Layer Video Sequence
CRA Clean Random Access
CVS Coded Video Stream
CVSS CVS Start
CU Coding Unit
DPS Decoding Parameter Set
DRAP Dependent Random Access Point
GDR Gradual Decoding Refresh
HEVC High-Efficiency Video Coding
IDR Instantaneous Decoding Refresh
TRAP Intra Random Access Point
LMCS Luma Mapping and Chroma Scaling
MPEG Motion Picture Experts Group
NAL Network Abstraction Layer
NALU NAL unit
NUT NAL unit type
PPS Picture Parameter Set
RADL Random Access Decodable Leading
RAP Random Access Point
RASL Random Access Skipped Leading
RBSP Raw Byte Sequence Payload
RPL Reference Picture List
SEI Supplemental Enhancement layer
SPS Sequence Parameter Set
STSA Step-wise Temporal Layer Access
VCL Video Coding Layer
VPS Video Parameter Set
VVC Versatile Video Coding In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

REFERENCES

JVET-Q0255-v1.zip, Versatile Video Coding, B. Bross, et. al.
JVET-Q0426-v1.zip, Versatile Video Coding, B. Bross, et. al.

The invention claimed is:

1. A method for decoding a picture from a bitstream, the method comprising:
obtaining a slice header for a slice of the picture, wherein the slice header comprises a state syntax element;
decoding a state value from the state syntax element in the slice header, wherein a) if the state value is not equal to a first value, then the state value indicates that the bitstream includes, for the picture, a picture header comprising a set of picture syntax elements and b) if the state value is equal to the first value, then the state value indicates that i) the slice header contains said set of picture syntax elements and ii) the bitstream does not include a picture header for the picture; and using a value of at least one syntax element in the set of picture syntax elements to decode the slice of the picture, wherein the bitstream comprises a coded layer video sequence, (CLVS), the picture is a picture within the CLVS, the CLVS comprises a plurality of slice headers including the slice header, and each slice header included in the CLVS comprises the state syntax element.

2. The method of claim 1, wherein the state syntax element is a binary flag.

3. The method of claim 1, wherein the set of picture syntax elements comprises a picture parameter set (PPS) syntax element encoding a value for identifying a PPS.

4. The method of claim 1, wherein obtaining the slice header comprises obtaining a network abstraction layer (NAL) unit comprising the slice header and slice data.

5. The method of claim 1, wherein the state value is not equal to the first value and the state value indicates that the bitstream includes a picture header for the picture.

6. The method of claim 5, further comprising, prior to obtaining the slice header, obtaining the picture header.

7. The method of claim 6, wherein obtaining the picture header comprises obtaining a first network abstraction layer (NAL) unit comprising the picture header, obtaining the slice header comprises obtaining a second NAL unit comprising the slice header, and the first NAL unit comprising the picture header precedes the second NAL unit comprising the slice header in a decoding order.

8. The method of claim 7, wherein the first NAL unit is a non-video coding layer (non-VCL) NAL unit, and the second NAL unit a video coding layer (VCL) NAL unit.

9. The method of claim 8, wherein the first and second NAL units belong to the same access unit or picture unit.

10. The method of claim 1, wherein the bitstream comprises a parameter set, and the parameter set does not contain the state syntax element.

11. A decoder, the decoder comprising:

processing circuitry; and memory containing instructions executable by the processing circuitry, wherein the decoder is operative to perform a method comprising:

obtaining a slice header for a slice of the picture, wherein the slice header comprises a state syntax element;

decoding a state value from the state syntax element in the slice header, wherein a) if the state value is not equal to a first value, then the state value indicates that the bitstream includes, for the picture, a picture header comprising a set of picture syntax elements and b) if the state value is equal to the first value, then the state value indicates that i) the slice header contains said set of picture syntax elements and ii) the bitstream does not include a picture header for the picture; and using a value of at least one syntax element in the set of picture syntax elements to decode the slice of the picture, wherein the bitstream comprises a coded layer video sequence (CLVS), the picture is a picture within the CLVS, the CLVS comprises a plurality of slice headers including the slice header, and each slice header included in the CLVS comprises the state syntax element.

12. The decoder of claim 11, wherein the state syntax element is a binary flag.

13. The decoder of claim 11, wherein the set of picture syntax elements comprises a picture parameter set (PPS) syntax element encoding a value for identifying a PPS.

14. The decoder of claim 11, wherein obtaining the slice header comprises obtaining a network abstraction layer (NAL) unit comprising the slice header and slice data.

15. The decoder of claim 11, wherein the state value is not equal to the first value and the state value indicates that the bitstream includes a picture header for the picture.

16. The decoder of claim 15, wherein the method further comprises, prior to obtaining the slice header, obtaining the picture header.

17. The decoder of claim 16, wherein obtaining the picture header comprises obtaining a first network abstraction layer (NAL) unit comprising the picture header, obtaining the slice header comprises obtaining a second NAL unit comprising the slice header, and the first NAL unit comprising the picture header precedes the second NAL unit comprising the slice header in a decoding order.

18. The decoder of claim 17, wherein the first NAL unit is a non-video coding layer (non-VCL) NAL unit, and the second NAL unit a video coding layer (VCL) NAL unit.

19. The decoder of claim 18, wherein the first and second NAL units belong to the same access unit or picture unit.

20. The decoder of claim 11, wherein the bitstream comprises a parameter set, and the parameter set does not contain the state syntax element.

* * * * *

UNITED STATES PATENT AND TRADEMARK OFFICE
CERTIFICATE OF CORRECTION

PATENT NO. : 12,143,619 B2
APPLICATION NO. : 18/238728
DATED : November 12, 2024
INVENTOR(S) : Sjöberg et al.

It is certified that error appears in the above-identified patent and that said Letters Patent is hereby corrected as shown below:

In the Specification

In Column 1, Line 11, delete "patent Ser. No. 11/490,106," and insert -- Pat. No. 11,490,106, --, therefor.

In Columns 1 & 2, in Table 2, under "Name of nal_unit_type", Line 7, delete "IDR_W_RAD" and insert -- IDR_W_RADL --, therefor.

In Columns 1 & 2, in Table 2, under "Content of NAL unit and RBSP syntax structure", Line 14, delete "silce_layer_rbsp( )" and insert -- slice_layer_rbsp( ) --, therefor.

In Column 3, Line 37, delete "(TRAP)" and insert -- (IRAP) --, therefor.

In Column 3, Line 61, delete "Temporand" and insert -- TemporalID --, therefor.

In Column 3, Line 62, delete "Temporand" and insert -- TemporalID --, therefor.

In Column 3, Line 65, delete "Temporand" and insert -- TemporalID --, therefor.

In Column 5, Lines 55-56, delete "data. The has a" and insert -- data, the --, therefor.

In Column 6, Lines 54-55, delete "NalType=(nal_unit_type==CODEDPIC)?pic_nal_type:nal_unit_type" and insert -- NalType=(nal_unit_type==CODED_PIC)?pic_nal_type:nal_unit_type --, therefor.

In Column 9, Line 50, delete "stream" and insert -- sequence --, therefor.

In Column 12, Line 51, delete "VA" and insert -- $V_A$ --, therefor.

In Column 12, Line 52, delete "SA" and insert -- $S_A$ --, therefor.

Signed and Sealed this
First Day of April, 2025

Coke Morgan Stewart
*Acting Director of the United States Patent and Trademark Office*

CERTIFICATE OF CORRECTION (continued)
U.S. Pat. No. 12,143,619 B2

In Column 12, Line 53, delete "VA" and insert -- $V_A$ --, therefor.

In Column 12, Line 56, delete "VB" and insert -- $V_B$ --, therefor.

In Column 12, Line 57, delete "SB" and insert -- $S_B$ --, therefor.

In Column 12, Line 60, delete "VB" and insert -- $V_B$ --, therefor.

In Column 12, Line 61, delete "VA," and insert -- $V_A$, --, therefor.

In Column 13, Line 1, delete "VB" and insert -- $V_B$ --, therefor.

In Column 13, Line 6, delete "VB" and insert -- $V_B$ --, therefor.

In Column 13, Line 22, delete "VA" and insert -- $V_A$ --, therefor.

In Column 13, Line 26, delete "VB" and insert -- $V_B$ --, therefor.

In Column 13, Line 30, delete "VB" and insert -- $V_B$ --, therefor.

In Column 13, Line 31, delete "VA," and insert -- $V_A$, --, therefor.

In Column 13, Line 39, delete "VA" and insert -- $V_A$ --, therefor.

In Column 13, Line 45, delete "VA" and insert -- $V_A$ --, therefor.

In Column 14, Line 53, delete "seat" and insert -- state --, therefor.

In Column 15, Line 26, delete "syntactic" and insert -- syntax --, therefor.

In Column 15, Line 62, delete "first date" and insert -- first state --, therefor.

In Column 15, Line 66, delete "first date" and insert -- first state --, therefor.

In Column 22, Line 32, delete "Stream" and insert -- Sequence --, therefor.

In Column 22, Line 40, delete "TRAP" and insert -- IRAP --, therefor.

In Column 22, Line 52, delete "layer" and insert -- Information --, therefor.